Patented Jan. 18, 1938

2,105,978

UNITED STATES PATENT OFFICE 2,105,978

SULPHURIZED VIOLANTHRONE DERIVATIVES AND PROCESS OF PREPARING SAME

William Hiram Lycan, South Milwaukee, Wis., assignor to E. I. du Pont de Nemours & Company, Wilmington, Del., a corporation of Delaware No Drawing. Application June 26, 1935, Serial No. 28,476

8 Claims. (Cl. 260—17)

This invention relates to carbon compounds and more particularly to derivatives of violanthrones and their preparation. It especially appertains to the substances produced by treating violanthrones having free Bz2:Bz2′ positions with an aldehyde (R—CHO), a carboxylic acid halide (R—CO—Halogen), a di-halo-methyl compound (R—HC—Halogen$_2$, R—C—Halogen$_2$—R), a carboxylic acid anhydride

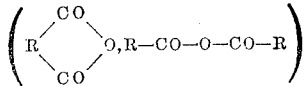

or a sulphonyl halide (R—SO$_2$—Halogen), until one molecular proportion of the treating compounds has been reacted with one molecular proportion of the violanthrone and thereafter treating the mono-substituted product with sulphur.

It is well known by those skilled in the art that compounds known as benzanthrones are produced when compounds of the anthraquinone series are condensed with glycerine (see United States of America Patents 818,992 of April 24, 1906 and 809,892 of January 9, 1906 to Bally & Isler and 786,085 of March 28, 1905 to Bally). When benzanthrones are fused with caustic alkali under appropriate conditions there are produced compounds known as violanthrones (see for example Color Index 1099, Enzyklopädie der Küpenfarbstaffe—Truttwin—1920, particularly pages 490 to 503, and Das Anthracen und die Anthrachinone—Houben—1929, particularly pages 736–777).

While the chemical structure of violanthrone is not positively known, it is generally believed to be as follows:

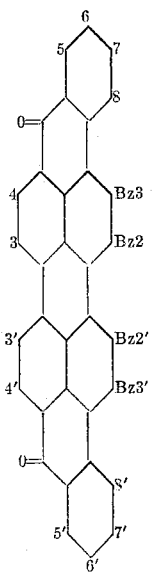

The numbers given in the formula are those usually assigned to the positions they adjoin.

Compounds having this general structure are powerful vat dyes. Since their discovery a tremendous amount of research work has been expended upon them. This work has developed the fact that two positions of such a nucleus are more reactive than the others. It is the general belief that the Bz2,Bz2′ positions are the ones showing this particular activity.

In British Patent #401,645 there is disclosed a process whereby violanthrones not substituted in the Bz2:Bz2′ positions may be treated to produce mono-substituted derivatives. Specifically in Example II thereof one molecule of violanthrone itself is condensed with one molecule of para-nitro-benzoyl chloride. In like manner in Example V, a reaction between violanthrone and 1-chloro-anthraquinone-2-carbonyl chloride is disclosed and in Example VIII treament of violanthrone with 1,9-anthrathiazol-2-carbonyl chloride is described. A similar disclosure is found in U. S. Patent 2,051,121 issued August 18, 1936.

Mono-substituted violanthrones are also obtained by a related process when carboxylic acid anhydrides are utilized. This is disclosed in the same British patent in Example XII. A similar disclosure is found in U. S. Patent 2,051,122 issued August 18, 1936. As shown in French Patent 772,824 and U. S. Patent 2,051,119 other mono-substituted violanthrones are also obtained by a somewhat similar process when aldehydes are employed. Treatment of violanthrones with sulphonyl halides and di-halo-methyl compounds under comparable conditions also produces mono-substituted compounds as is shown in Examples I, II, III, IV, V and VI of this application and U. S. Patents 2,051,045 and 2,051,120 issued August 18, 1936.

It has now been found that new organic chemical compounds, new vat dyes, new vat colors, new colored carbon compounds, new intermediates, new vattable compositions of matter and new violanthrone derivatives may be produced by treating the mono-substituted violanthrones of the aforementioned types with sulphur.

This invention had for an object the preparation of new chemical compounds, new derivatives of violanthrones and new processes for the production of violanthrone derivatives. Other objects were the preparation of a new series of carbon compounds in a very desirable physical form and in a high state of purity. Still further objects were to produce new vat dyes, new sulphur containing derivatives of violanthrones and to devise new chemical processes. A general advance in the art and other objects which will appear hereinafter are also contemplated.

The foregoing objects and related ends are accomplished in the manner set out in the following description in which details of what is believed to be the best mode for carrying out the invention are disclosed.

Specifically one method for accomplishing the aforementioned objects, carrying out the new processes, and obtaining the newly discovered products, is by treating with sulphur the monosubstituted violanthrones resulting from condensing (or reacting) violanthrones having free Bz2:Bz2' positions with the various reagents enumerated above and their chemical equivalents.

The invention will be further understood by a consideration of the following detailed description and illustrative specific examples in which the quantities are given in parts by weight.

Example I

In a suitable receptacle, there was placed 500–600 parts of antimony trichloride and the same heated to 180° C. To this melt was added 250–300 parts of anhydrous aluminum chloride under agitation. During the addition the temperature dropped to 100°–120° C. It was raised to 150°–155° C. in order to permit the aluminum chloride to digest completely. When a clear solution was obtained the temperature was lowered to 100°–120° C. and 100 parts of finely powdered violanthrone were introduced over a period of one-half to one hour. Complete digestion was permitted to take place. This took place in approximately thirty minutes at 110°–120° C. When this was accomplished 40–50 parts of ortho-chloro-benzal chloride were introduced into the melt at 90°–100° C. at such a rate as not to allow the temperature to rise over 100° C.

When the addition was complete the temperature was cautiously raised to 140°–160° C. for a period of 2–4 hours. The smooth melt was then drowned in a cold solution of hydrochloric acid containing 5–10% HCl, heated to 50°–90° C. and subsequently filtered. The residue was washed with 2–5% hot hydrochloric acid and then with hot water until free of acid. The reaction appears to proceed in such a manner as to allow the chlorine atom on the phenyl nucleus to remain intact. This fact was substantiated by an elementary analysis of the end product. The residual product, which was a dark blue paste assumed, when dry, the physical appearance of a violet powder. Its sulphuric acid solution was reddish-blue to blue.

Example II

To a melt of essentially the same proportions of antimony trichloride and aluminum chloride as specified in Example I, there was added 100 parts of violanthrone at 110°–120° C. under good agitation. When complete digestion of the violanthrone had taken place, 67–83 parts of 1-chloro-2-omega-di-chloro-methyl-anthraquinone were introduced into the smooth melt. When this was completed the temperature was raised by heating to 160°–200° C. and maintained within this range for a period of 2–3 hours or until a test sample showed no further evidence of a color change in sulphuric acid. The color change developed in this instance was a brilliant blue differing from the reddish-violet color of violanthrone. The end product was isolated in a manner similar to that described in Example I. Analysis indicated that the alpha-chlor atom was not removed during the reaction.

Example III

Six hundred (600) parts of anhydrous antimony trichloride are heated to 180° C. and to this molten mass there were added under good agitation 300 parts of anhydrous aluminum chloride. This addition resulted in a decrease in temperature to 100°–120° C. Heat was then applied and the temperature raised to 150°–155° C. where it was held until the melt was completely homogeneous. The melt was allowed to cool to 95°–100° C. and 100 parts of finely pulverized violanthrone were added over a period of 15–60 minutes. When the reaction mass was again homogeneous, and at the same temperature, 35–40 parts of benzene sulphonyl chloride were dropped slowly onto the surface of the melt over a period of 30–60 minutes. After a brief period of agitation, the temperature of the reaction mixture was raised to 140°–180° C. and maintained within these limits for 2–6 hours. At the end of this time, condensation being complete, the entire reaction mass was drowned in cold solution of hydrochloric acid (containing 5–10% HCl). The resulting suspension was brought to a boil and subsequently filtered. Antimony and aluminum salts were removed from the residual cake by repeated washings with 2–5% hydrochloric acid solution in the hot and the acid was finally removed by washing with hot water. The product thus obtained, when dry, was a dark violet powder, which yielded a blue violet coloration in sulphuric acid. It gave a reddish-blue alkaline sodium hydrosulphite vat.

Example IV

A melt composed of 600 parts of anhydrous antimony trichloride and 300 parts of anhydrous aluminum chloride was prepared as described in the preceding example. To this melt at 95°–100° C. there was added 100 parts of violanthrone and subsequently, at a similar temperature, 60–70 parts of anthraquinone-2-sulphonyl chloride were added over a period of 30–60 minutes. After agitating several minutes at this temperature, heat was applied and the reaction temperature raised to 150°–180° C. It was maintained within these limits for 2–6 hours, after which time the condensation was complete. The reaction mass was then drowned in 5–10% hydrochloric acid solution and the product was obtained in a manner similar to that described in the preceding example. The new composition thus obtained was a dark violet powder, the sulphuric acid solution of which is less reddish-blue than that of the product of the preceding example.

Example V

A melt composed of 300 parts of anhydrous antimony trichloride and 150 parts of anhydrous aluminum chloride, was prepared in the manner previously described. To this melt, maintained at 95°–100° C., there was added 50 parts of violanthrone and at a similar temperature 20–25 parts of anthraquinone-2,6-di-sulphonyl chloride were added over a period of 30–60 minutes. After agitating a few minutes, the temperature was raised to 140°–160° C. and held within these limits for 2–6 hours. The resulting condensation product was freed from the reaction mass as described in Example III and there resulted a dark reddish-blue powder. It resembled very closely the product obtained by condensing violanthrone with anthraquinone-2-sulphonyl-chloride.

*Example VI*

To a melt of essentially the same proportions of anhydrous aluminum and antimony chlorides as that described in Example V, there was added 100 parts of violanthrone at 95°–100° C. While holding the temperature within these limits 30 parts of methoxy-sulphonyl-chloride (methyl-chloro-sulphonate) was added over a period of 15–45 minutes. After a few minutes agitation at this temperature, heat was applied and the temperature was raised to 140°–160° C. where it was held for 2–6 hours. It was then drowned in dilute hydrochloric acid solution (HCl) and the product isolated exactly as set out in the previous examples. The new compound produced dissolved in sulphuric acid to produce blue solutions.

*Example VII*

One hundred (100) parts of violanthrone were intimately mixed with 35–40 parts of phthalic anhydride and then introduced into 400–600 parts of anhydrous aluminum chloride containing about 20–25% of dry sodium chloride (common salt). The whole was then slowly heated to 180°–200° C., with good stirring. The mass first became fluid and finally changed to a very stiff melt. The heating was continued however, until no further hydrogen chloride was evolved. This usually required from two to four hours. The resultant mass was then taken up with ice water, boiled vigorously, and filtered. The residual bluish-violet cake was then boiled out with dilute ammonia solution and again filtered and washed first with hot water and then hot alcohol.

Thirty (30) parts of the resultant finely pulverized bluish-violet dry powder (which has a brownish-red sulphuric acid solution and gives red alkaline hydrosulphite vats) were introduced into a previously prepared melt comprising 240 parts of sulphur and 3 parts of copper oxide, the temperature at the time of introduction being about 200° C. The resultant reaction mass was quite viscous and was heated at once to 265° C.–275° C. for 4 to 10 hours. It was then allowed to cool, the resulting solid mass chipped out of the container and ground to a sixty mesh powder. The uncombined sulphur was removed by thorough extraction with concentrated sodium sulphide solution and the copper oxide was removed by subsequent extraction with hot dilute hydrochloric acid. The dye thus obtained, when dry, is a black powder soluble in sulphuric acid with a red-violet coloration. The vat (alkaline hydrosulphite) is also red-violet and from it cotton is dyed in greenish-blue shades of excellent fastness.

*Example VIII*

To a melt of 400–600 parts of aluminum trichloride in which 100 parts of violanthrone (dibenzanthrone) have been dissolved or incorporated at 90°–100° C., were added 40–50 parts of benzoic anhydride. The temperature was then raised to 160°–180° C. within a period of one-half to one hour and maintained at this level for approximately two to four hours. The melt was then poured into ice or cold water which has been previously acidulated with hydrochloric acid. The suspension thus obtained was heated to 90°–100° C. and the resultant solid isolated by filtration. The residual bluish-violet cake was then boiled out with dilute ammonia solution, again filtered and washed first with hot water and then with ethyl alcohol.

Fifty (50) parts of the resultant dry powder were added to a melt comprising 400 parts of sulphur in the manner described in Example VII. In a similar manner there was produced a vat dye giving blue shades of excellent fastness on cotton.

*Example IX*

One hundred (100) parts of violanthrone were intimately mixed with 40–45 parts of para-nitrobenzoyl chloride and 200–300 parts of anhydrous aluminum chloride containing 20% salt (NaCl). The whole was then heated to 160°–180° C. for a period of 4–8 hours or until no further hydrogen chloride was liberated. When the reaction was completed the whole mass was poured into ice water and the suspension boiled for about ½ to 1 hour. The resultant solid was then filtered off and subsequently extracted with hot dilute alkaline solution followed by extraction with hot ethyl alcohol. The product contained nitrogen probably in the form of a nitro group. Fifty (50) parts of this finely pulverized condensation product were added to a sulphur melt containing 450 parts of sulphur in the manner described in Example VII. Upon completion of the fusion as previously described there was obtained a dyestuff dyeing cotton blue shades of very good fastness.

*Example X*

One hundred (100) parts of violanthrone were introduced into 300–400 parts of tri-chloro-benzene. To this suspension there was first added 40–45 parts of para-nitro-benzoyl chloride and then 200–250 parts of anhydrous aluminum chloride. The whole was then heated to 160°–180° C. for about 8–10 hours. The fusion mass was then steam distilled in order to remove the organic solvent. The solid obtained was subsequently isolated and purified as indicated in the preceding example. The product obtained was similar to that obtained in the preceding example. By virtue of the nitro groups which it contains it is reducible to an amine. The entire press cake was in this instance reduced to a corresponding amino body by treatment with warm sodium sulphide solution. Specifically, the cake was suspended in 4000 parts of water containing in solution 30 parts of fused sodium sulphide. The resulting suspension was heated for two hours at 95° C., was filtered hot and the residue washed with hot water. The reduction to an amino derivative can also be satisfactorily carried out by means of alkaline sodium hydrosulphide in the manner well known to those skilled in the art as for example by vatting.

Fifty (50) parts of the amino compound resulting from the sodium sulphide reduction were suspended in and treated with 390 parts of sulphur in the manner described in Example VII. The resulting sulphur-containing violanthrone derivative was isolated in the manner described in Example VII. There was obtained as a result a vat dye which dyed cotton blue shades from a reddish-violet alkaline hydrosulphite vat.

*Example XI*

One hundred (100) parts of violanthrone were suspended in 300–400 parts of tri-chloro-benzene under agitation. To this suspension was added 60–70 parts of 1-chloro-anthraquinone-2-carbonyl chloride followed by an addition of 200–300 parts of anhydrous aluminum chloride at 60°–80° C. The temperature was then raised to 180°–190° C. and maintained at this level for a period of 6–8 hours. The fusion mass was steam distilled in order to remove the tri-chlorobenzene. The residual product was extracted with dilute hydrochloric acid followed by an extraction with dilute alkali and finally with ethyl alcohol. The dry powder of the product thus obtained is a bluish-violet powder having a reddish-brown to reddish-violet sulphuric acid solution. The product contains molecular chlorine. A melt was prepared by carefully heating 500 parts of sulphur until it had reached a temperature of 200° C. At this temperature 50 parts of the product obtained above, was added in portions with good agitation. During the addition the melt became quite viscous. The temperature was then raised to 260°–275° C. and the melt slowly agitated under these conditions until no further change could be noted in the test dyeings made from thief samples from the reaction mixture. About 4–10 hours were required for completion of the reaction. The entire mass was then allowed to cool whereupon it set to a hard gray mass. This hard mass was chipped out of the reaction vessel and ground to a sixty mesh powder. The powder thus obtained was extracted with concentrated sodium sulphide solution at the boiling temperature. The product was then isolated and dried, there being obtained a black powder containing chemically combined sulphur. It gave red-violet solutions in sulphuric acid and was readily soluble in alkaline hydrosulphite solutions.

The product vatted to a red-violet color from which cotton was dyed in greenish-blue to pure blue shades. It was found that the resulting product could be used directly as a vat dye or in combination with suitable yellow or orange vat dyes to give a direct black. It is therefore useful for either general dyeing or printing. It is characterized by excellent general fastness.

*Example XII*

One hundred (100) parts of violanthrone were intimately mixed with 65–70 parts of 1,9-anthrathiazol-2-carbonyl-chloride and the mixture introduced into 4–6 parts of anhydrous aluminum chloride. The whole was then heated to 160°–190° C. and maintained at this level until no further evolution of hydrogen chloride was perceptible (this usually takes from four to eight hours). The nearly dry mass was transferred to a large volume of cold water containing ice. The suspension was boiled under agitation for about ½ hour and directly filtered. The residual dyestuff was then boiled out with alkali and again filtered, washed alkali free and dried. The product thus obtained contains combined sulphur and nitrogen in molecular proportions, that is to say, one molecule of violanthrone has combined with one molecule of anthrathiazol-2-carbonyl-chloride by an elimination of hydrogen chloride. In the manner described in Example XI, 50 parts of the above obtained product were treated in a sulphur melt. The resulting vat color was isolated in a manner related to that described in Example XI. The dyestuff obtained in this way differed from that of Example XI in that the dyeings are somewhat greener and duller.

*Example XIII*

Six hundred (600) parts of anhydrous antimony tri-chloride, are heated to 180° C. and to this molten mass there were added under good agitation 300 parts of anhydrous aluminum chloride. This addition resulted in a decrease in temperature to 100°–120° C. Heat was then applied and the temperature raised to 150°–155° C., where it was held until the melt was completely homogeneous. The melt was allowed to cool to 95°–100° C. and 100 parts of finely pulverized violanthrone were added over a period of 15 to 60 minutes. When the reaction mass was again homogeneous, and at the same temperature, 67–83 parts of 1-chloro-2-omega-di-chloromethyl anthraquinone were added slowly to the melt over a period of 30–60 minutes. After a brief period of agitation, the temperature of the reaction mixture was raised to 140°–180° C. and maintained within these limits for 2–6 hours. At the end of this time, condensation being complete, the entire reaction mass was drowned in cold solution of hydrochloric acid (containing 5–10% HCl). The resulting suspension was brought to a boil and subsequently filtered. Antimony and aluminum salts were removed from the residual cake by repeated washings with 2–5% hydrochloric acid solution in the hot and the acid was finally removed by washing with hot water. The product thus obtained, when dry, was a dark violet powder, which yielded a blue violet coloration in sulphuric acid. It gave a reddish-blue hydrosulphite vat.

A melt was prepared by heating 150 parts of naphthalene to about 150°–170° C. and adding portion-wise 150 parts of sulphur. The melt was agitated at 150°–170° C. until it became homogeneous whereupon 30 parts of the above identified condensation product were sifted into the molten mass. The temperature was then raised to reflux (somewhat above 200° C.) and the refluxing continued for 10–30 hours. When the reaction was complete the melt was cooled to 150° C. and diluted with boiling solvent naphtha. The resulting suspension was filtered on a hot funnel and the cake washed with several portions of boiling solvent naphtha. The solvent was removed by washing with alcohol and the remaining traces of sulphur were removed by extraction with boiling sodium sulphide solution. The product thus obtained was identical in all respects with that obtained according to Example XI.

*Example XIV*

A melt was prepared from 300 parts of anhydrous antimony tri-chloride and 150 parts of anhydrous aluminum chloride and in it there was condensed 50 parts of violanthrone and 300 parts of anthraquinone-2-sulphonyl chloride in the manner described in Example XIII. When the condensation was complete the melt was cooled to 105°–110° C. and the resulting monosubstituted violanthrone isolated in the manner described in the preceding example. Thirty (30) parts of the resultant product were treated with a sulphur melt as described in Example XIII and the resultant sulphur-containing violanthrone derivative isolated. It had general properties related to those of the final sulphur-containing products in the preceding examples.

*Example XV*

To a melt of essentially the same proportion of antimony tri-chloride and aluminum chloride, as specified in Example XIV, there were added 100 parts of violanthrone at 110°–120° C. under good agitation. The melt was stirred until it was again homogeneous and there was added 50–60 parts of anthraquinone-2-aldehyde at such a rate that the temperature was maintained at 110°–120° C.

When the addition was complete, the temperature was raised to 160°–200° C. and maintained there for a period of 2–3 hours. At the end of this time the melt was drowned in a large volume of cold 5% hydrochloric acid solution. The resulting suspension was brought to the boil and was filtered. The residue was freed from antimony and aluminum salts by repeated washings with hot dilute solutions of hydrochloric acid and the acid was finally removed by washing with hot water. The product thus obtained, when dry, was a violet-blue powder which dissolved to a brilliant blue solution in concentrated sulphuric acid. Thirty parts of the above identified condensation product of violanthrone with anthraquinone-2-aldehyde were treated with sulphur in a melt as described in Example XIII. The product when isolated has properties similar to that of the related compounds whose production is described above.

The invention is not limited to the treatment with sulphur of the mono-substituted violanthrones produced by aluminum tri-chloride condensations of violanthrones having free Bz2,Bz2' positions with the specific organic carboxylic acid anhydrides, carboxylic acid halides, sulphonyl halides, aldehydes and omega-di-halides of the above examples, the reaction involving these functional groups being general. As specific of examples of members of these groups advantageously used, the following merit special mention: anthraquinone-2-sulphonyl chloride, anthraquinone-2,6-di-sulphonyl-di-chloride, anthraquinone-2,7-di-sulphonyl-chloride, 1-bromo-anthraquinone-2-carbonyl bromide, 1,9-anthrathiazole-2-carbonyl chloride, 1,9-anthrathiazole-2-carbonyl bromide, 1,9-anthraselenazole-2-carbonyl chloride, 1,9-anthraselenazole-2-carbonyl bromide, 1,9-anthrathiophene-2-carbonyl chloride, 1,9-anthrathiophene-2-carbonyl bromide, 1,9-anthrathiazole-4-carbonyl chloride, 1,9-anthrathiazole-5-carbonyl chloride, 1,9-anthraselenazole-4-carbonyl chloride, 1,9-anthraselenazole-5-carbonyl chloride, 1,9-anthrathiophene-4-carbonyl chloride, 1,9-anthrathiophene-5-carbonyl chloride, meta-nitro-benzoyl-chloride, ortho-nitro-benzoyl-chloride, 3-chloro-anthraquinone-2-carbonyl chloride, 1-chloro-anthraquinone-4-carbonyl chloride, 1-chloro-anthraquinone-6-carbonyl chloride, 1-chloro-anthraquinone-7-carbonyl chloride, ortho-chloro-benzoyl chloride, benzoyl bromide, chloro-benzoyl bromides, benzoyl chloride, para-brom-benzoyl-chloride, alpha-naphthoyl chloride, beta-naphthoyl chloride, anthraquinone-2-carbonyl chloride, anthraquinone-1-carbonyl chloride, 1-nitro-anthraquinone-6-carbonyl chloride, 1-nitro-anthraquinone-2-carbonyl chloride, phthaloyl chloride, succinyl chloride, oxalyl chloride, acetyl chloride, butyric acid chlorides, chloro-benzoic acid anhydride, para-nitro-benzoic acid anhydride, para-brom-benzoic acid anhydride, alpha-naphthoic acid anhydride, beta-naphthoic acid anhydride, anthraquinone-2-carboxylic acid anhydride, paramethyl-benzoic acid anhydride, butyric acid anhydrides, propionic acid anhydrides, metaldehyde, ortho-chlorobenzaldehyde, ortho-chloro-benzal chloride, para-aldehyde, para-formaldehyde, benzaldehyde, para-chloro-benzaldehyde, meta-nitro-hyde, para-chloro-benzaldehyde, chloro-naphthaldehyde, nitro-naphthaldehyde, anthraquinone-2-aldehyde, 1-chloro-anthraquinone-2-aldehyde, 1-nitro-anthraquinone-6-aldehyde, 1-amino-anthraquinone-2-aldehyde, 1-amino-anthraquinone-6-aldehyde, 1-chloro-2-omega-dichloro-methyl-anthraquinone, 1-chloro-6-omega-di-chloro-methyl-anthraquinone, p-nitro-benzoyl-chloride, m-nitro-benzoyl-bromide, p-toluloyl-chloride, 1-chloro-anthraquinone-2-carbonyl chloride, 1-chloro-anthraquinone-2-carbonyl bromide, phthalic-anhydride, benzoic-anhydride, acetic-anhydride, maleic-anhydride, succinic-anhydride, benzene-sulphonyl chloride, p-bromo-benzene sulphonyl chloride, 2-nitro-toluene-4-sulphonyl chloride, anthraquinone-1-sulphonyl-chloride, 1-nitro-anthraquinone-6-sulphonyl-chloride, anthraquinone-2,6-di-sulphonyl chloride, methoxy-sulphonyl chloride, 1-nitro-anthraquinone-6-sulphonyl bromide, 1-amino-anthraquinone-2-sulphonyl chloride, naphthalene-sulphonyl chloride, choloro-naphthalene-sulphonyl chloride, nitro-naphthalene-sulphonyl chloride, ortho-chloro-benzene-sulphonyl chloride, meta-nitro-benzene-sulphonyl chloride, butane-1-sulphonyl chloride, methane-sulphonyl chloride.

The temperature at which the reaction takes place involving the sulphur with which the violanthrone derivatives are heated, depends somewhat upon the particular body being halogenated, the suspension medium or solvent and the convenience of the person carrying out the treatment with sulphur.

In general the temperature for the treatment with sulphur is above the melting point of sulphur and below the temperature at which undesirable decomposition of the final product results. In cases where a suspension medium is used as an adjuvant to the sulphur, the boiling point of the resultant mixture (or solution) will obviously determine the upper temperature limit. Experience has indicated that temperatures above 200° C. give the most desirable results. The temperature and time factors are quite elastic. Temperatures within the range 150°–250° C. have been found quite satisfactory and the same is true of time limits within the range 5–30 hours. Continued heating after the reaction is complete does not appear to detrimentally affect the dyes produced.

The solvent or suspension agent for the sulphur treatment reaction is selected to suit the particular conditions. In addition to such diluents as are described in the specific examples above, mention may be made of tri-chloro-benzene which is eminently suitable. The selection of a solvent adjuvant will depend to a large extent upon the person carrying out the reaction and the product to be obtained. The suspension medium may be removed from the final product in any of the desired ways as will be apparent to those skilled in the art.

Carbon di-sulphide or other solvents may replace the solvent naphtha or the diluent may be removed by steam distillation if desired.

Extraction with caustic will sometimes be found suitable for isolation (purification) of the dyestuff.

It has previously been proposed to heat di-nitro-violanthrone with sulphur, as will be clear from a study of U. S. P. 1,546,859 but apparently the gray to black dyes obtained do not have properties such as to make them commercially important at the present time.

The amount of diluent used in conjunction with the sulphur may be varied, as desired. Usually, however, 1 to 8 parts of the diluent per part of sulphur give satisfactory results. As will be clear from the specific examples the diluent may be omitted entirely. Sodium or other alkali metal sulphides may be employed with the sulphur if desired.

Other catalysts such as antimony tri-sulphide may replace the copper oxide mentioned above. A carrier for the catalyst may be used if found convenient.

The products produced according to this invention are not only valuable dyes but are also useful intermediates in the preparation of dyes. The new products are suitable for general dyeing purposes and are especially valuable in printing. A wide variety of shades can be obtained and the working properties are very satisfactory.

As many apparently widely different embodiments of this invention may be made without departing from the spirit and scope thereof, it is to be understood that I do not limit myself to the specific embodiments thereof except as defined in the appended claims.

I claim:

1. The process which comprises condensing a member of the group consisting of organic carbonyl halides, organic sulphonyl halides, aldehydes, carboxylic acid anhydrides and di-halomethyl carbon compounds with a violanthrone having the Bz2,Bz2' positions free and thereafter heating the product with sulphur.

2. The product obtainable by condensing a member of the group consisting of organic carbonyl halides, organic sulphonyl halides and aldehydes, carboxylic acid anhydrides and di-halomethyl carbon compounds with a violanthrone having the Bz2,Bz2' positions free and thereafter heating the product with sulphur.

3. In the process of preparing vat dyes the step of reacting with sulphur, the mono-substituted violanthrone obtainable by condensing a violanthrone having the Bz2,Bz2' positions unoccupied with one molecular proportion of a member of the group consisting of organic carbonyl halides, organic sulphonyl halides, aldehydes, carboxylic acid anhydrides and di-halo-methyl carbon compounds.

4. The process which comprises suspending 100 parts of violanthrone in 300 to 400 parts of trichlorobenzene with agitation, adding 60 to 70 parts of 1 - chloro - anthraquinone - 2 - carbonyl chloride, adding 200 to 300 parts of anhydrous aluminum chloride while maintaining a temperature of 60° to 80° C., raising the temperature of the reaction mass to 180° to 190° C. and maintaining it for 6 to 8 hours, removing the trichloro-benzene by steam distillation, extracting the residual product with dilute hydrochloric acid, extracting with dilute alkali, extracting with ethyl alcohol, adding 50 parts of this final product with good agitation to 500 parts of sulphur which has been carefully heated to 200° C., raising the temperature of this reaction mass to 260° to 275° C., agitating the melt slowly until no further change is noted, cooling the reaction mass, grinding the same to a powder, extracting the resulting powder with sodium sulphide solution at boiling temperature and isolating and drying.

5. The product of claim 4 which is a vat color giving red-violet alkaline hydrosulphite vats and dyeing cotton greenish-blue to blue shades.

6. The process which comprises condensing an organic carbonyl halide with a violanthrone having the Bz2,Bz2' positions free and thereafter heating the product with sulphur.

7. The product obtainable by condensing an organic carbonyl halide with a violanthrone having the Bz2,Bz2' positions free and thereafter heating the product with sulphur.

8. In the process of preparing vat colors the step of reacting with sulphur the mono-substituted violanthrone obtainable by condensing a violanthrone having the Bz2,Bz2' positions unsubstituted with one molecular proportion of an organic carbonyl halide.

WILLIAM HIRAM LYCAN.

CERTIFICATE OF CORRECTION.

Patent No. 2,105,978. January 18, 1938.

WILLIAM HIRAM LYCAN.

It is hereby certified that error appears in the printed specification of the above numbered patent requiring correction as follows: Page 3, second column, line 53, for "hydrosulphide" read hydrosulphite"; and that the said Letters Patent should be read with this correction therein that the same may conform to the record of the case in the Patent Office.

Signed and sealed this 29th day of March, A. D. 1938.

(Seal)

Henry Van Arsdale,
Acting Commissioner of Patents.